United States Patent
Dussud

(10) Patent No.: US 7,284,108 B2
(45) Date of Patent: *Oct. 16, 2007

(54) SYSTEMS AND METHODS FOR MULTIPROCESSOR SCALABLE WRITE BARRIER

(75) Inventor: Patrick H. Dussud, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/233,909

(22) Filed: Sep. 23, 2005

(65) Prior Publication Data

US 2006/0020766 A1   Jan. 26, 2006

Related U.S. Application Data

(63) Continuation of application No. 10/422,116, filed on Apr. 23, 2003, now Pat. No. 6,973,554.

(51) Int. Cl.
*G06F 12/06* (2006.01)
(52) U.S. Cl. ................. 711/170; 707/206; 707/205
(58) Field of Classification Search ........... 711/170, 711/159, 160, 165; 707/206, 205; 709/104
See application file for complete search history.

(56) References Cited

U.S. PATENT DOCUMENTS

| | | | |
|---|---|---|---|
| 5,920,876 A | | 7/1999 | Ungar et al. |
| 6,049,810 A | * | 4/2000 | Schwartz et al. ........... 707/206 |
| 6,065,020 A | | 5/2000 | Dussud |
| 6,115,782 A | * | 9/2000 | Wolczko et al. ........... 711/100 |
| 6,148,309 A | | 11/2000 | Azagury et al. |
| 6,148,310 A | * | 11/2000 | Azagury et al. ........... 707/206 |
| 6,173,294 B1 | * | 1/2001 | Azagury et al. ........... 707/206 |
| 6,185,581 B1 | | 2/2001 | Garthwaite |
| 6,226,653 B1 | | 5/2001 | Alpern et al. |
| 6,317,756 B1 | | 11/2001 | Kolodner et al. |
| 6,470,361 B1 | | 10/2002 | Alpern et al. |
| 6,490,599 B2 | | 12/2002 | Kolodner et al. |
| 6,502,111 B1 | | 12/2002 | Dussud |

(Continued)

FOREIGN PATENT DOCUMENTS

WO   WO9848353   10/1998

OTHER PUBLICATIONS

Urs Holzle, "A Fast Write Barrier for Generational Garbage Collectors," OOPLSA '93 Garbage Collection Workshop, Oct. 1993.*

(Continued)

*Primary Examiner*—Pierre-Michel Bataille
(74) *Attorney, Agent, or Firm*—Lee & Hayes, PLLC

(57) ABSTRACT

Systems and methods providing a multiprocessor scalable write barrier to a main memory card table are described. The main memory is divided into multiple cards bit-mapped by the card table. In one aspect, an application store operation (reference) associated with one of the cards is detected. Responsive to detecting the reference, card table bit(s) that are mapped to the card are evaluated. Responsive to determining that the bit(s) have already been marked as dirty, the card table bit(s) are not again marked. This technique effectively reduces the probability of more than a single overlapping write operation to a card table cache line by two or more processors in the system.

20 Claims, 3 Drawing Sheets

U.S. PATENT DOCUMENTS

| | | | |
|---|---|---|---|
| 6,510,440 | B1 | 1/2003 | Alpern et al. |
| 6,829,686 | B2 * | 12/2004 | Mathiske et al. ........... 711/159 |
| 6,845,347 | B1 | 1/2005 | Yang et al. |
| 6,845,437 | B2 | 1/2005 | Borman et al. |
| 6,928,460 | B2 | 8/2005 | Nagarajan et al. |
| 2004/0003014 | A1 | 1/2004 | Nagarajan et al. |
| 2004/0187102 | A1 | 9/2004 | Garthwaite |

OTHER PUBLICATIONS

Hosking et al., "A Comparative Performance Evaluation of Write Barrier Implementations, " ACM Conference on Object-Oriented Programming Systems, Languages, and Applications, pp. 92-109, Oct. 1992.*

Wilson, P.R., "A Card-Marking Scheme for Controlling Intergenerational References in Generation-Based Garbage Collection on Stock Hardware," ACM SIGPLAN Notices, 24-5:87-92 (1989).*

Hosking, A.L., et al., "Remembered Sets Can Also Play Cards," OOPSLA '93, Workshop on Garbage Collection and Memory Management, Washington D.C., Sep. 1993.*

"A Parallel Incremental and Concurrent GC for Servers" ACM Sigplan Notices vol. 27 No. 5 pp. 129-140 May 2002.

"Research Demonstrations of a Hardware Reference-Countying Heap" LISP and Symbolic Computation vol. 10 No. 2 pp. 159-181 Jul. 1997.

"Java Virtual Memory Timing Probes: A Study of Object Life Span and Garbage Collection" Conference Proceedings of the IEEE International Performance Computing and Communications pp. 73-80 Apr. 2002.

A. Hosking, J. Moss, D. Sefanovic, AComparative Performance Evaluation of Write Farrier Implementations, pp. 1-18 Proceedings ACM Conference on Object-Oriented Programming Systems, Languages, & Applications; Vancouver, Canada, Oct. 1992, pp. 92-109.

"An On-the Fly Reference Counting Garbage Collector for Java" ACM Sigplan Notices vol. 36 No. 11 pp. 367-380 Nov. 2001.

"Object Resizing and Reclamation Through the Use of Hardware Bit-Maps" Microprocessors and Microsystems vol. 25 No. 9-10 pp. 459-467 Jan. 2002.

Hosking, A.L., et al. Remembered Sets Can Also Play Cards, OOPSLA '93, Workshop on Garabage Collection and Memory Management, Washington D.C., Sep. 1983.

Chang et al; "DMMX: Dynamic Memory Management Extensions" Journal of Systems and Software, vol. 63 No. 3, Sep. 2002, pp. 187-199.

Wilson, P.R., A Card-Marking Scheme for Controlling Intergenrational References in Generation-Based Garabage Collection on Stock Hardware, ACM SIGPLAN Notices, 24-5:87-92 (1998).

Jones "Garbage Collection", pp. 171-173, Inter-Generational Pointers, Sep. 17, 1996.

Parallet Garbage Collection for shared Memory Multiprocessores. Flood, Detlefs, Savit, Zhang, USENIX Java virtual Machine Research & Technology Symposium, Apr. 23-24, 2001. California, USA.

Kwon et al; "Java Garbage Collection for a Small Interactive System" Jounal of Korean Information Science Society, vol. 29 No. 11-12, Dec. 2002, pp. 957-965.

Jones et al., "Garbage Collection, Algorithms for Automatic Dynamic Memory Management", 1996, John Wiley & Sons, pp. 172-173.

Sobalvarro, Patrick G., "A Lifetime-based Garbage Collector for LISP Systems on General-Purpose Computers", Sep. 1988, pp. 1-59.

Tanenbaum, Andrew S., "Structured Computer Organization", 1984, Prentice-Hall, Inc., 2nd Edition, pp. 10-12.

* cited by examiner

SYSTEMS AND METHODS FOR MULTIPROCESSOR SCALABLE WRITE BARRIER

RELATED APPLICATIONS

This patent application is a continuation of U.S. patent application Ser. No. 10/422,116, titled "Systems and Methods for Multiprocessor Scalable Write Barrier", filed on Apr. 23, 2003, now U.S. Pat. No. 6,973,554, commonly owned hereby, and incorporated by reference.

BACKGROUND

Automatic memory management is one of the services Common Language Runtime (CLR) provides to an application during execution. Such memory management includes, for example, garbage collection (GC) to manage the allocation and release of memory for an application. GC implementations, such as the CLR GC, are often generational, based on a notion that newly generated objects are short-lived, tend to be smaller, and are accessed often. To this end, a generational GC (GGC) keeps track of object references from older to younger (i.e., object generations) so that younger objects can be garbage-collected without inspecting every object in older generation(s). For instance, generation zero ($G_0$) contains young, frequently used objects that are collected often, whereas $G_1$ and $G_2$ are used for larger, older objects that are collected less frequently.

To facilitate GGC, an application's memory heap is divided into multiple equally sized cards that are usually bigger than a word and smaller than a page. The GGC uses a "card table", which is typically a bitmap, to map each card to one or more respective bits, usually a byte. At every reference (i.e., store instruction) to a card that creates or modifies a pointer from an older to a newer object, the GGC records/marks the card being written into by setting the card's corresponding card table bits. Subsequently, when scanning an older generation to identify intergenerational references for garbage collection (i.e., when collecting a younger generation), only the cards (in the old generation) identified by corresponding marked card table bits are scanned.

Card-marking is also a well known technique to implement "write barrier". In particular, a write barrier call is inserted by the compiler in places where there is a store object reference instruction. This write barrier stores the object reference and also marks the card corresponding to the location of the store. Such card marking is required to be atomic with respect to other processors/threads to ensure that one thread does not undue another thread's work. Although such thread synchronization maintains data integrity, it also typically slows down thread execution, and thereby, overall system performance.

In view of this, certain programming techniques may be used to reduce the probability that more than a single thread will compete for access to any particular object at any one time. Such techniques generally involve storing each object in its own cache line (i.e., an object will not share a same cache line with any other object). This technique effectively reduces competition by multiple threads for a same cache line during object store operations. Unfortunately, this programming technique does not alleviate problems caused when multiple threads compete for a same cache line in the card table, wherein each card of a system's main memory is represented with one or more bits, during card marking operations. To make matters worse, such conventional programming techniques are not realistically transferable to the card table because prohibitive amounts of memory would be required to represent each of the card table's atomic values (one or more bits mapped to a card) with its own cache line.

In view of this, systems and methods to improve system performance during card marking/write barrier operations are greatly desired.

SUMMARY

Systems and methods providing a multiprocessor scalable write barrier to a main memory card table are described. The main memory is divided into multiple cards bit-mapped by the card table. In one aspect, an application store operation (reference) associated with one of the cards is detected. Responsive to detecting the reference, card table bit(s) that are mapped to the card are evaluated. Responsive to determining that the bit(s) have already been marked as dirty, the card table bit(s) are not again marked. This technique effectively reduces the probability of more than a single overlapping write operation to a card table cache line by two or more processors in the system.

BRIEF DESCRIPTION OF THE DRAWINGS

The following detailed description is described with reference to the accompanying figures. In the figures, the left-most digit of a component reference number identifies the particular figure in which the component first appears.

DETAILED DESCRIPTION

Overview

Figure 1:
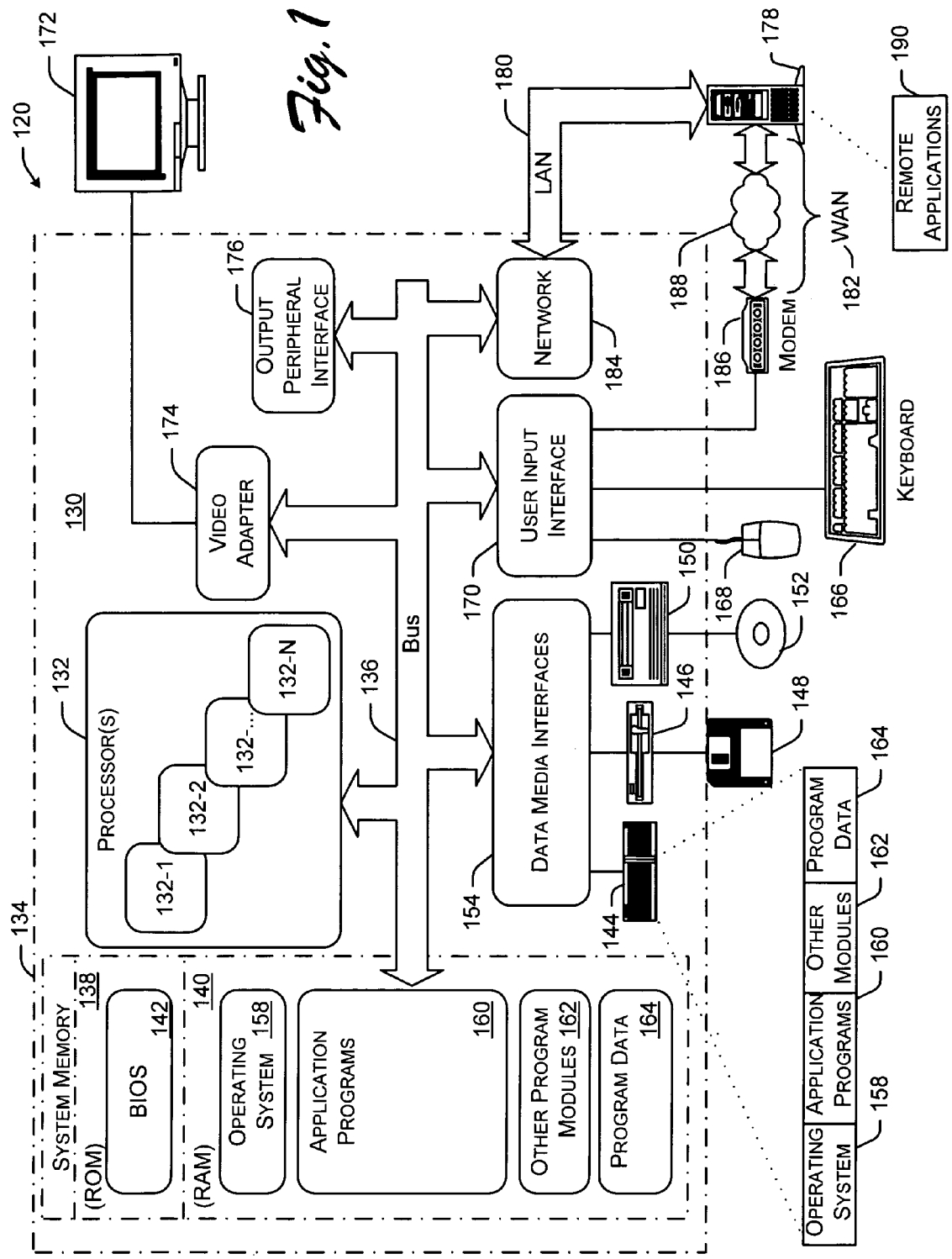
FIG. 1 is a block diagram of an exemplary computing environment within which systems and methods for multiprocessor scalable write barrier may be implemented.

Systems and methods are described to reduce the potential that two or more processors in a multiprocessor environment will compete for overlapped access to a same card table cache line during program store operations. To achieve this reduction, card marking operations read (e.g., check or evaluate) the one or more bits corresponding to the particular card into which a thread is going to store a value. If the one or more bits are already set (not clear), then the card is not re-marked. Otherwise, if the card has not been marked, the card marking operations write (an atomic operation) to the one or more bits to mark the card. Once a card has been set it is not again (repeatedly) set by running program threads. (When the GC collects the data from the card (releases or frees data/an object), the corresponding card table bit(s) are cleared).

In light of this, for each unmarked card in main memory, there is a probability of at most only a single instance of thread contention to a cache line corresponding to a card table during card marking operations. This is especially advantageous in multiprocessing environments, wherein triggered data coherency operations between different processor threads generally result in substantial degradation of multiprocessor system operating performance.

In one implementation, the described card marking techniques are scalable across multiprocessor and single processor computing environments. To this end, when two or more processors are detected, the novel card mark checking operations are compiled in a CLR by well known Just-in-Time (JIT) compiling techniques or precompiled, and executed during card marking operations. This streamlines data coherency operations in the multiprocessing environment. When only a single processor system is detected, the card mark checking operations are not compiled (i.e., bypassed or skipped), therefore streamlining program execution (e.g., via reduced code size and reliance on single processor pre-emption of threads) for the single processor system.

Exemplary Operating Environment

Turning to the drawings, wherein like reference numerals refer to like elements, the invention is illustrated as being implemented in a suitable computing environment. Although not required, the invention is described in the general context of computer-executable instructions, such as program modules, being executed by a personal computer. Program modules generally include routines, programs, objects, components, data structures, etc., that perform particular tasks or implement particular abstract data types.

FIG. 1 illustrates an example of a suitable computing environment 120 on which the subsequently described systems, apparatuses and methods to provide a multiprocessor scalable write barrier may be implemented. Exemplary computing environment 120 is only one example of a suitable computing environment and is not intended to suggest any limitation as to the scope of use or functionality of systems and methods the described herein. Neither should computing environment 120 be interpreted as having any dependency or requirement relating to any one or combination of components illustrated in computing environment 120.

The methods and systems described herein are operational with numerous other general purpose or special purpose computing system environments or configurations. Because the following describes systems and techniques scale write barrier operations across both multiprocessor and single processor systems, examples of well known computing systems, environments, and/or configurations that may be suitable include, but are not limited to, include hand-held devices, symmetrical multi-processor (SMP) systems, microprocessor based or programmable consumer electronics, network PCs, minicomputers, mainframe computers, portable communication devices, and the like. The invention may also be practiced in distributed computing environments where tasks are performed by remote processing devices that are linked through a communications network. In a distributed computing environment, program modules may be located in both local and remote memory storage devices.

As shown in FIG. 1, computing environment 120 includes a general-purpose computing device in the form of a computer 130. In one implementation, the components of computer 130 includes two or more processors 132-1 through 132-N, a system memory 134, and a bus 136 that couples various system components including system memory 134 to processor 132. In another implementation, wherein the scalable nature of GC write barrier operations are configured for optimal operation on a single-processor system, the computer 130 includes only one processor 132, for example, 132-1. Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media. In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM. RAM typically contains data and/or program modules that are immediately accessible to and/or presently being operated on by processor(s) 132-1 through 132-N.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system (OS) 158 to provide a runtime environment, one or more application programs 160, other program modules 162, and program data 164. In one implementation, wherein the computer 130 comprises two or more (i.e., "N") multiple processors 132-1 through 132-N, the (OS) supports N-way symmetric multi-processing (SMP) between the N processors, and other services (e.g., Internet and network operating system (NOS) services, load balancing, etc).

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit(s) 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 176.

Computer 130 may operate in a networked environment using logical connections to one or more remote computers, such as a remote computer 178. Remote computer 178 may include many or all of the elements and features described herein relative to computer 130. Logical connections shown in FIG. 1 are a local area network (LAN) 180 and a general wide area network (WAN) 182. Such networking environments are commonplace in offices, enterprise-wide computer networks, intranets, and the Internet.

When used in a LAN networking environment, computer 130 is connected to LAN 180 via network interface or adapter 184. When used in a WAN networking environment, the computer typically includes a modem 186 or other means for establishing communications over WAN 182. Modem 186, which may be internal or external, may be connected to system bus 136 via the user input interface 170 or other appropriate mechanism.

Depicted in FIG. 1, is a specific implementation of a WAN via the Internet. Here, computer 130 employs modem 186 to establish communications with at least one remote computer 178 via the Internet 188.

In a networked environment, program modules depicted relative to computer 130, or portions thereof, may be stored in a remote memory storage device. Thus, e.g., as depicted in FIG. 1, remote application programs 190 may reside on a memory device of remote computer 178. It will be appreciated that the network connections shown and described are exemplary and other means of establishing a communications link between the computers may be used.

Figure 2:
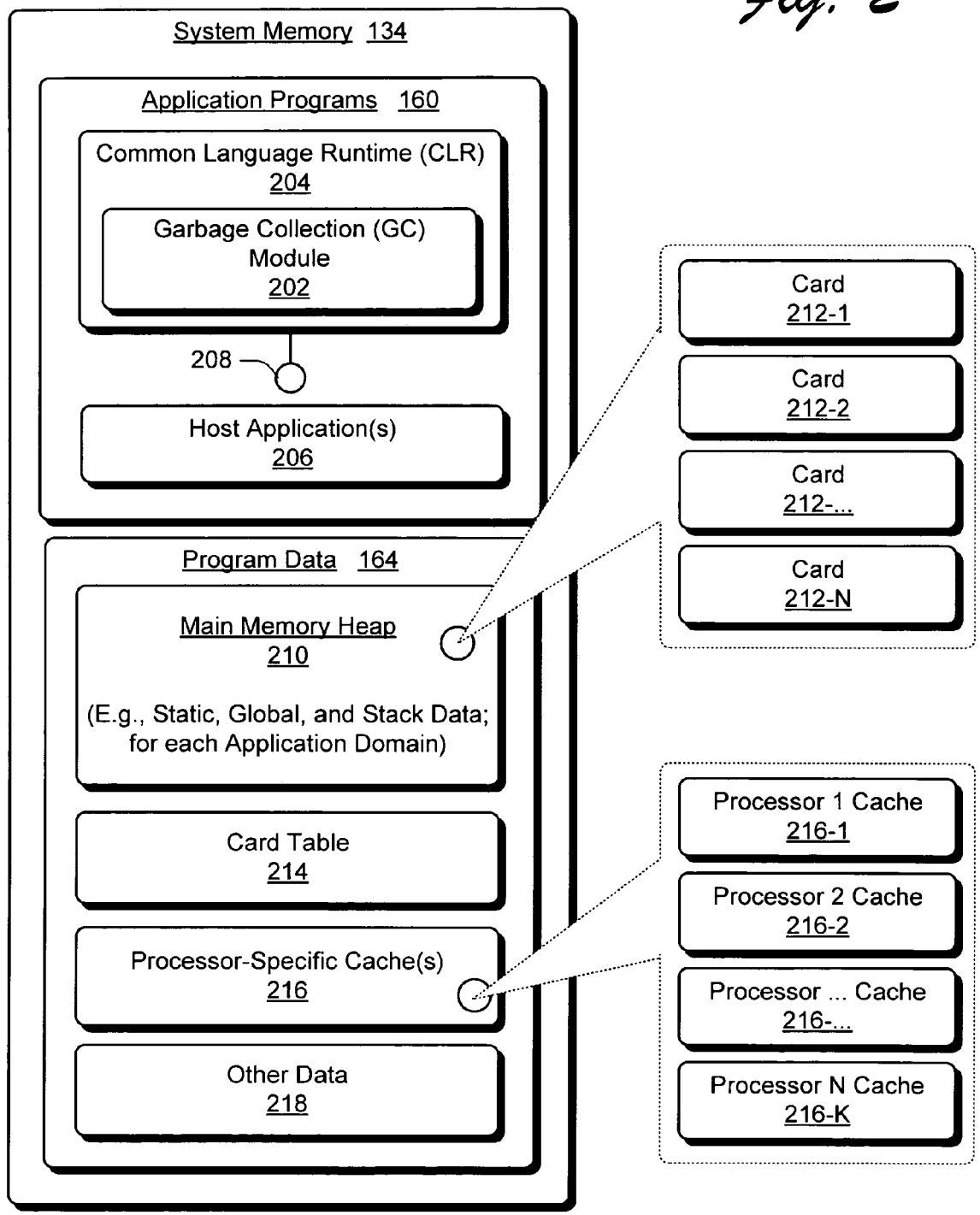
FIG. 2 is a block diagram that shows further exemplary aspects of system memory of FIG. 1, including application programs and program data used for multiprocessor scalable write barrier.

FIG. 2 is a block diagram that shows further exemplary aspects of system memory 134 of FIG. 1, including application programs 160 and program data 164. In view of this, the features of FIG. 2 are often discussed in reference to features of FIG. 1. Application programs includes garbage collection (GC) module 202, which implements scalable multiprocessor write barrier operations. The GC module can be a standalone module, for example, that is used to implement OS GC functionality. However, in this implementation, the GC module is hosted by a Common Language Runtime (CLR) 204, which is a cross-platform run-time environment. The CLR may provide additional services, for example, JIT compiling for compiling multiple languages (including scripting languages) into a binary form known as the Intermediate Language (IL), which the CLR then runs. This allows for GC module functionality to target multiple computing platforms.

In this implementation, one or more host application(s) 206 host the CLR 204 (hereinafter also referred to as the "runtime") by loading the runtime into the host application process when the process is executed. Once the runtime has been loaded into the process, the host uses a well known exposed application programming interface (API) 208 to access CLR managed memory management functionality, for example, via the novel GC module 202. The GC module implements generational garbage collection (GGC) techniques such that younger objects are collected without inspecting every object in older generation(s).

The program data 164 portion of the system memory 134 includes, for example, a main memory heap 210 that is shared by one or more processor(s) 132-1 through 132-N (FIG. 1). The main memory heap is divided into multiple cards 212 (i.e., cards 212-1 through 212-N) of a configurable size (e.g., from a word to less than a page in size). Hosting application(s) 206 store respective application data into respective application domain(s) in the main memory heap. Such application data includes, for example, static and global objects, local variable/parameters object pointers, pointers to objects in the memory heap (CPU stack), etc. One application domain card size may be different than another application domain card size; however, card size within an application domain is the same.

The main memory heap 210 further includes a card table 214 for GC module 202 multiprocessor scalable card marking/write barrier operations. The card table represents each card 212 in the main memory heap with one or more bits.

The program data 164 further includes processor-specific cache(s) 216 and other data 218 such as application data, intermediate values, configuration data, and/or the like. As discussed above, whenever a processor 132-1 through 132-N (FIG. 1) references (a store operation) a cache line from the main memory heap 210, the processor must load the entire cache line into its processor-specific cache. To this end, there will be an equivalent number of processor-specific caches as there are processors in the system. For example, for 1-N processors there are 1-K processor caches such as processor 1 cache 216-1 through processor N cache 216-K, wherein N=K.

An Exemplary Procedure

Figure 3:
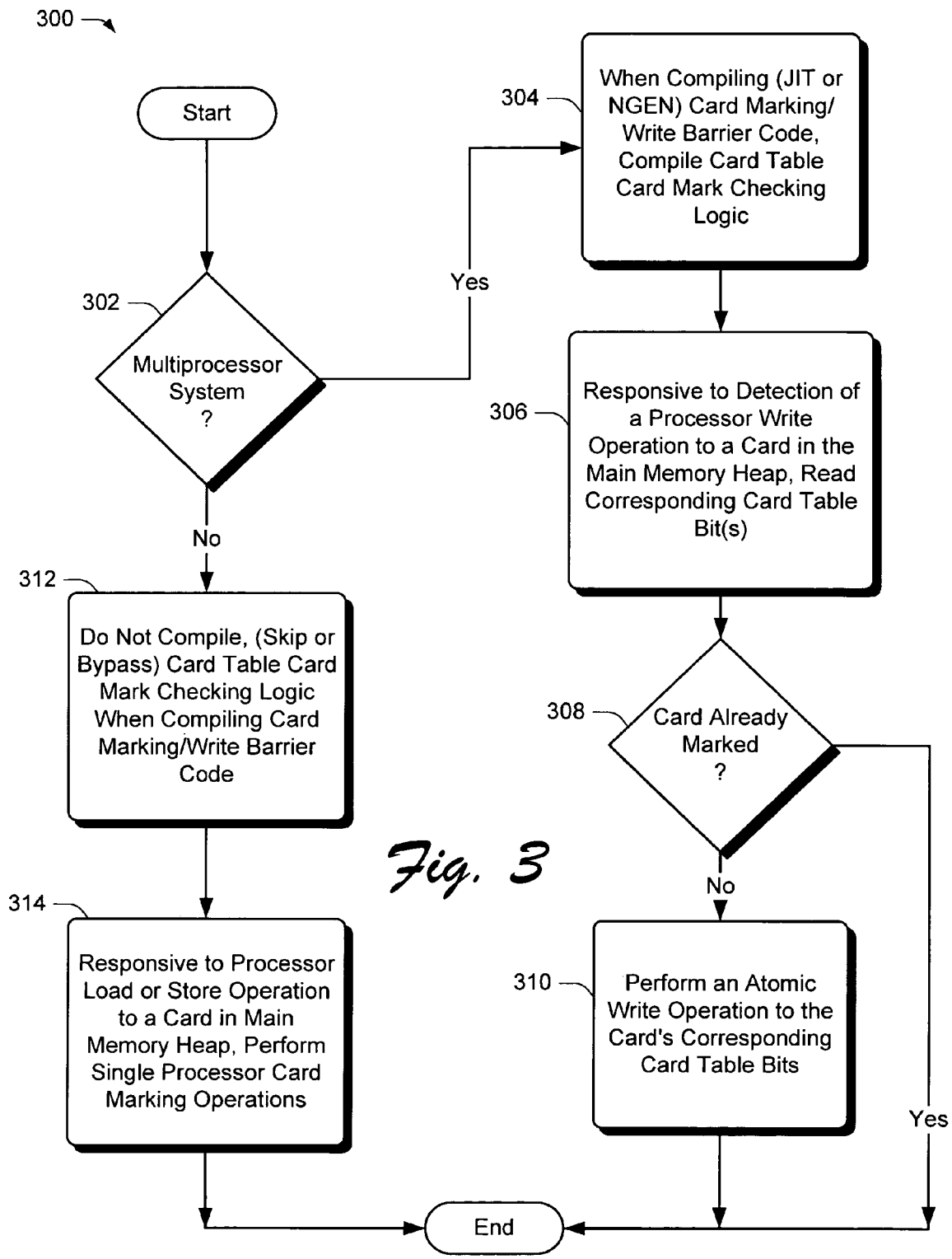
FIG. 3 shows an exemplary procedure for multiprocessor scalable write barrier.

FIG. 3 shows an exemplary procedure 300 to provide a multiprocessor scalable write barrier. For purposes of discussion, these procedural operations are described in reference to program module and data features of FIGS. 1 and 2. In this implementation, garbage collection (GC) module 202 of FIG. 2 (via CLR 204 services) is being utilized by one or more host applications 206 (FIG. 2).

At block 302, the CLR 204 (FIG. 2) determines the number of processors 132-1 through 132-N (FIG. 1) being used in system 130 (FIG. 1). Techniques to determine the number of processors on a computing system are well known. If the system includes two or more processors such as in a symmetrical multiprocessor (SMP) system, operations continue at block 304. At block 304, the scalable multiprocessor write barrier code functionality incorporated in the GC module 202 (FIG. 2) is compiled. The compilation operation of block 304 can be performed during GC module 202 execution, for instance, by a JIT compiler, or precompiled prior to GC module execution. For purposes of this discussion one or more code compilers are represented in FIG. 1 as respective portions of "other program modules" 162 of FIG. 1.

As described below in reference to block 312, such card mark checking code is not compiled in a single processor implementation of system 130 (FIG. 1). Techniques such as setting conditional statements around pre-compiled code as a function of compile/execution-time (e.g., JIT compiling) circumstances are well known. Such conditional compilation of card table 212 (FIG. 2) card mark checking operations of block 304 provide substantially optimal single to multiprocessor scalability (reduced execution code size and conditional operations in the case of a single processor system—see, block 314) of write barrier functionality of the GC module 202 (FIG. 2).

At block 306, responsive to a GC module 202 (FIG. 2) detection of a processor 132-1 through 132-N (FIG. 1) reference to a location in a card 212 (i.e., one of the cards 212-1 through 212-N), the GC module reads the one or more bits in the card table 214 that are bit-mapped to the card. At block 308, the GC module determines whether the referenced card is already marked (i.e., set) as a result of being written into. (Once a card has been collected any corresponding card table bit(s) are cleared; set to zero). If the card table bit(s) are clear (not marked), the procedure continues at block 310, wherein the GC module performs an atomic write operation (store) to the card table bits. At this point, the card has been marked, indicating that the card includes at least one pointer to an object for subsequent GC module collection operations. If the operations of block 308 determine that the referenced card has already been marked, the card's corresponding card table bit(s) are not again marked, meaning that an atomic write operation is not again (repeatedly) performed, and the write barrier/card marking procedure ends.

In this manner, the described systems 120 of FIGS. 1 and 2 and methods of FIG. 3 provide microprocessor scalable write barrier/card marking techniques that avoid repeated writing into the card's corresponding card-table cache line after it has already been set (i.e., dirtied). This eliminates the situation where two or more processors write the same card-table cache line repeatedly (i.e., as typically occurs during write barrier operations of conventional systems described in the background section). In light of this, for each unmarked card in the multi-processor system's main memory heap 210 (FIG. 2), there is a probability of at most only a single processor-to-processor atomic write operation during GC card module 202 (FIG. 2) marking operations. This provides a substantial increase in multiprocessor system operating performance as compared to when conventional multiprocessor system GC card marking operations are utilized.

Conclusion

The described systems and methods provide a multiprocessor scalable write barrier. Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

The invention claimed is:

1. A computing device comprising:
a processor; and a
main memory coupled to the processor, the main memory having been divided into multiple cards that are bit-mapped by a card table, the main memory comprising computer-program instructions executable by the processor for:
  detecting, by a Common Language Runtime Garbage Collector (CLR GC), an application reference directed to a card of the multiple cards;
  reading, by the CLR GC, of one or more bits of the card table, the one or more bits having been bit-mapped to the card; and
  responsive to reading, if the one or more bits have already been marked, reducing probability of more than one processor-to-processor contention to a cache line comprising the one or more bits.

2. The computing device of claim 1, wherein the probability corresponds to any access to the card prior to a CLR GC collection of an object(s) associated with the card subsequent to the computer-program instructions for reducing.

3. The computing device of claim 1, wherein the computer-program instructions responsive to reading further comprise instructions for, if the one or more bits are not marked, card marking, by the CLR GC, the one or more bits.

4. The computing device of claim 1, wherein the computer-program instructions for reducing further comprise instructions for not card marking, by the CLR GC, the one or more bits.

5. The computing device of claim 1, wherein the computer-program instructions further comprise instructions for:
  determining whether the main memory is utilized by two or more processors in a symmetrical multiprocessing system (SMP); and
  if the main memory is not utilized by a SMP system:
    bypassing the computer-program instructions for reading;
    card marking the one or more bits in response to the application reference; and
    wherein the instructions for bypassing scale multiprocessor write barrier to a single processor system.

6. The computing device of claim 5, wherein the computer-program instructions for bypassing further comprises instructions for skipping a card table check operation when compiling at least a portion of the CLR GC.

7. A computer-implemented method providing multiprocessor scalable write barrier to a main memory, the main memory including multiple cards mapped by a card table, the method comprising:
  detecting an application store operation to a location in a card of the multiple cards;
  responsive to detecting, determining that one or more bits in the card table have already been marked, the one or more bits being mapped to the card;
  responsive to the determining, not again card marking the one or more bits; and
  wherein the not again card marking the one or more bits reduces probability of an overlapping write operation to a card table cache line comprising the one or more bits by two or more processors.

8. The method of claim 7, wherein detecting, determining, and not again card marking are performed by a garbage collector (GC).

9. The method of claim 7, wherein detecting, determining, and not again card marking performed by a Common Language Runtime.

10. The method of claim 7, wherein detecting, determining, and not again card marking eliminates probability of more than a single overlapping write operation to the card table cache line before a subsequent garbage collection operation associated with the cache line.

11. The method of claim 7, further comprising marking the one or more bits if the one or more bits are not marked.

12. The method of claim 7, further comprising:
  determining whether the main memory is being utilized by two or more processors in a symmetrical multiprocessing system (SM); and
  if the main memory is not part of an SMP system:
    bypassing the determining and not again card marking the one or more bits; and
    card marking the one or more bits in response to the application store operation.

13. The method of claim 12, wherein the bypassing is performed by a compiler, and wherein the bypassing further comprises skipping a card table check operation when compiling at least a portion of code that is directed to performing the operations of detecting, determining, and not card marking.

14. The computer-implemented method of claim 13, wherein the compiler comprises a just-in-time compiler.

15. The computer-implemented method of claim 14, wherein the compiler accesses the main memory.

16. The computer-implemented method of claim 7, wherein the method is performed at least in part by a memory management module of an operating system.

17. A computer-readable medium comprising computer-program instructions executable by a processor to provide multiprocessor scalable write barrier to a main memory, the main memory including multiple cards mapped by a card table, the computer-program instructions comprising instructions for:

detecting, by a garbage collector, an application reference to a location in a card of the multiple cards;

responsive to detecting, determining, by the garbage collector, whether one or more bits of the card table are marked, the one or more bits being mapped to the card;

if the one or more bits are not marked, card marking, by the garbage collector, the one or more bits, the card marking being an atomic write operation; and if the one or more bits have already been marked, not again card marking, by the garbage collector, the one or more bits to reduce probability of multiple processor contention to a cache line comprising the one or more bits during a card marking operation.

18. The computer-readable medium of claim 17, wherein the garbage collector is a service of a Common Language Runtime.

19. The computer-readable medium of claim 17, wherein the computer-program instructions further comprise instructions for:

identifying whether the main memory is utilized by two or more processors in a symmetrical multiprocessing system (SMP);

if the main memory is not part of an SMP system:

bypassing the determining operation; and card marking, by the garbage collector, the one or more bits in response to the application reference.

20. The computer-readable medium of claim 19, wherein the computer-program instructions for bypassing further comprise instructions for skipping a card table check operation when compiling at least a portion of the garbage collector.

* * * * *